United States Patent [19]

Amano et al.

[11] Patent Number: 4,742,367

[45] Date of Patent: May 3, 1988

[54] PHOTOGRAPHIC INFORMATION SETTING DEVICE

[75] Inventors: Kenichiro Amano, Tokyo; Yoshihito Harada, Yokohama; Masayoshi Kiuchi, Sagamihara; Ryuichi Kobayashi; Masaharu Kawamura, both of Kawasaki, all of Japan

[73] Assignee: Canon Kabushiki Kaisha, Tokyo, Japan

[21] Appl. No.: 918,774

[22] Filed: Oct. 14, 1986

[30] Foreign Application Priority Data

Oct. 15, 1985 [JP] Japan ................................. 60-230509
Oct. 17, 1985 [JP] Japan ................................. 60-232976
Oct. 17, 1985 [JP] Japan ................................. 60-232977
Oct. 17, 1985 [JP] Japan ................................. 60-232978

[51] Int. Cl.⁴ ..................... G03B 7/00; G03B 7/091; G03B 17/18
[52] U.S. Cl. .................... 354/289.1; 354/486
[58] Field of Search ............... 354/289.1, 289.12, 486; 377/17, 26

[56] References Cited

U.S. PATENT DOCUMENTS

| | | | |
|---|---|---|---|
| 4,304,482 | 12/1981 | Suzuki et al. | 354/289.1 |
| 4,309,598 | 1/1982 | Davis, Jr. | 377/17 |
| 4,530,586 | 7/1985 | Ogawa | 354/289.1 X |
| 4,554,674 | 11/1985 | Sakai et al. | 377/17 |

Primary Examiner—W. B. Perkey
Attorney, Agent, or Firm—Robin, Blecker & Daley

[57] ABSTRACT

The present invention relates to a photographic information setting device having a switch arranged to turn on and off and generate digital data when a stepwise operating member changes its position, wherein the turning on and off of the switch is detected with the help of current supply to the switch to renew the digital data until a desired value of any exposure factor is preset. In the present invention, when the aforesaid stepwise operating member lies in any of click-stopped positions, the current supply to the switch is cut off to prevent wasteful consumption of electrical energy. The number of times of turning on and off of the switch is once stored in a counter, and, upon detection of turning on and off of the switch, a computer reads out the content of the counter so that the renewed digital data are formed in the interior of the computer.

19 Claims, 10 Drawing Sheets

PHOTOGRAPHIC INFORMATION SETTING DEVICE

BACKGROUND OF THE INVENTION

1. Field of the Invention

This invention relates to information setting devices in which an on/off signal of switch means responsive to movement of an operating member is detected by a microcomputer so that the photographic data to be preset are renewed on the basis of the on/off signal of the switch means.

2. Description of the Related Art

It has been known to provide an information setting device employing the above-described method of setting data into the computer based on the on or off states of the switch means, in, for example U.S. patent application Ser. No. 669,591, now abandoned, assigned to the assignee of the present invention.

In this type of device, as the operating member has the form of, for example, a dial of which one revolution recycles the on and off operation of the switch a large number of times, if the dial is turned at a high speed, it will often happen that the number of pulses produced as the on/off signal becomes too many to allow for response of the computer to the on/off signal when they are directly applied to the computer.

Also, the above-described conventional device has another feature that the switch is supplied with current constantly to produce the on/off signal.

Meanwhile, in the case when the switch is made to turn on and off in cooperation with the dial, the current supplying state may be limited only to the time of the operating dial taking the operative position. In the inoperative position, on the other hand, there is no need to detect the on/off signal of the switch, and, therefore, the cutting-off of the current supply is rather desirable in the point of view of saving the consumption of electrical energy. In the above-described conventional device, however, the current supply was maintained even in the inoperative position.

SUMMARY OF THE INVENTION

An object of the invention is to provide an information setting device in which a digital value is formed by the on/off signal of switch means in response to movement of an operating member, and is read in a microcomputer where the digital value is used as the input data when an information is set in.

In this connection, the present invention has features that use is made of a counter receptive of the on/off signal of the switch means for performing a counting operation, and that the microcomputer is actuated in response to start of the on/off signal of the switch means, reading out the content of the counter. Thus, the use of the counter as a buffer enables the computer to read out the data accurately and reliably even when the operating member is moved at a very high speed.

Another object is to provide an information setting device with means making it possible to prevent wasteful consumption of electrical energy.

To achieve this, the above-described switch is arranged to cooperate with a dial or other rotary operating member so that the on/off signal is obtained from the switch by moving the aforesaid member and further not to be supplied with current when the operating member lies in any at-rest position.

Other objects, features and advantages of the invention will become apparent from the following description of an embodiment thereof by reference to the accompanying drawings.

BRIEF DESCRIPTION OF THE DRAWINGS

FIGS. 8(a) to 8(d) and 9 are waveforms illustrating a manner in which the circuits of FIGS. 3 and 4 operate.

DETAILED DESCRIPTION OF THE PREFERRED EMBODIMENTS

Next, the information setting device according to the invention will be explained on the basis of an illustrated embodiment.

Figure 1:
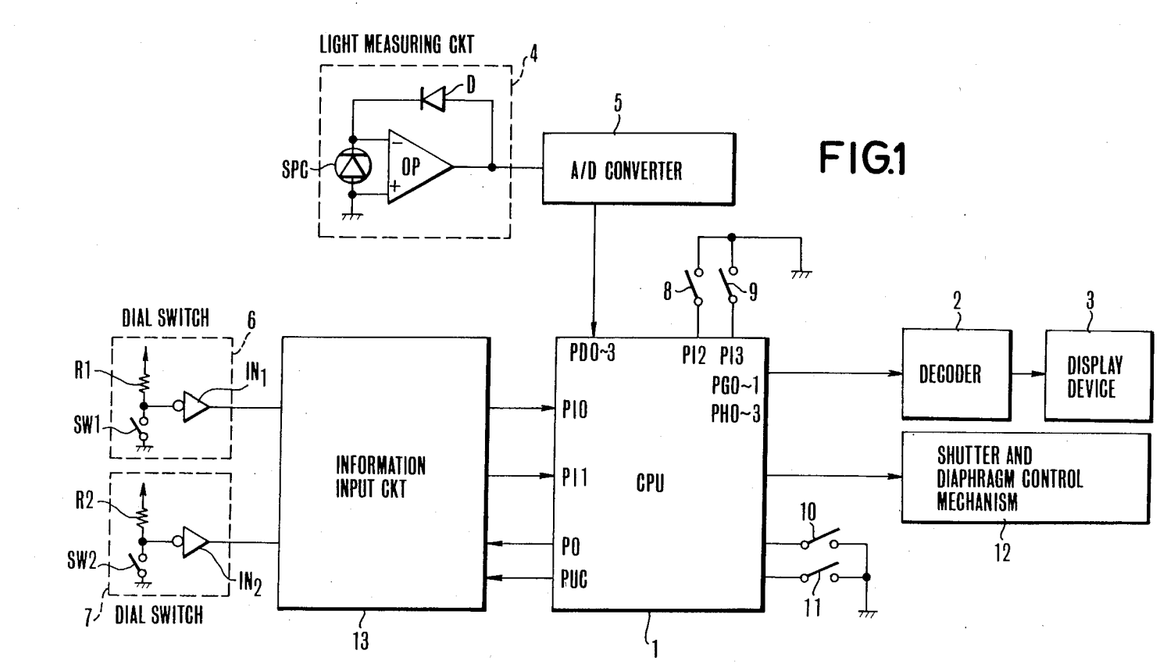
FIG. 1 is a block diagram of an embodiment of the information setting device according to the present invention applied to a camera.

FIG. 1 is an electrical circuit diagram illustrating the construction of the main parts of a camera employing the information setting device of the invention. A microcomputer 1 (hereinafter referred to as "CPU") is programmed for all capabilities of the camera such as those necessary to make exposures. By the commands from this unit, each mechanism of the camera is operated. Photographic information is converted by a decoder 2 to signals suited to be displayed in a display device 3 having, for example, four 7-segment liquid crystal display elements. A light measuring circuit 4 comprises a photosensitive element SPC connected between two inputs of an operation amplifier OP and a compression diode D connected in the feedback network. This output is applied to an A/D converter 5 which produces an output in digital form. This output is applied to the CPU 1. Equivalent switch circuits to the patterns on a dial to be described later are shown at 6 and 7 respectively comprising switches SW1 and SW2, pullup resistors R1 and R2 and inverters IN1 and IN2. Only when the switch SW1 or SW2 turns on (as the dial patterns are conductively engaged, as discussed below, the circuit 6 or 7 produces an output of high level (binary "1"). An exposure mode selector or switch 8 for the programmed, shutter speed priority and aperture priority automatic exposure modes is arranged to cooperate with a push-button type actuator (not shown). An ISO information selector or switch 9 is arranged to cooperate with an ISO button (not shown). A light measurement start switch 10 and a release switch 11 when off are pulled up by resistors (not shown). The switch 10 turns on when a release operating member (not shown) is in a first operative position. Upon subsequent operation of the release operating member to a second operative position, the switch 11 turns on. The shutter and diaphragm of the camera are controlled by a mechanism 12. The information from the dial is decoded and counted by an information input circuit 13.

Figure 2:
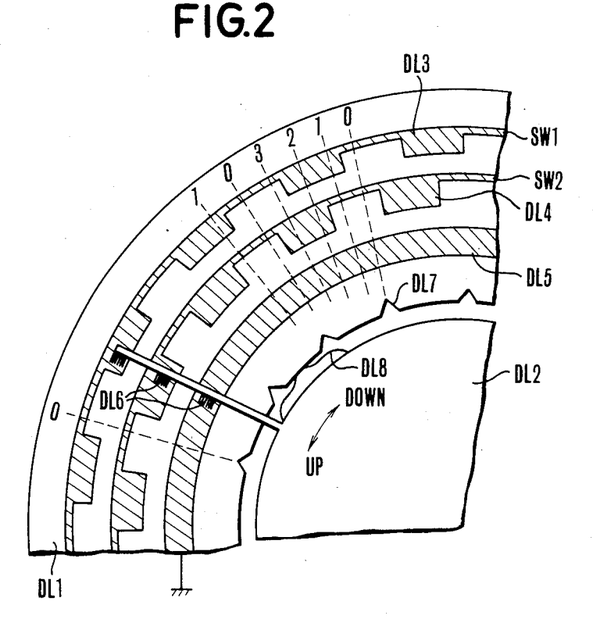
FIG. 2 is a fragmentary plan view of the mechanical structure of switches in the circuit of FIG. 1.

FIG. 2 illustrates the structure of electrically conductive patterns constituting each of the switches SW1 and SW2 of FIG. 1 on the dial. DL1 is an electrode pattern portion fixed to the camera. DL2 is a rotary portion drivenly connected to a setting dial (not shown). DL3 are electrodes provided on the electrode pattern portion DL1, constituting the switch SW1 together with a brush DL6 arranged upon movement of the rotary portion DL2 to slidingly move on the electrode DL3, and a common electrode pattern DL5.

DL4 are electrodes provided on the electrode pattern portion DL1 and, similarly to the electrodes DL3, constitute the switch SW2 together with the brush DL6 and the common electrode DL5.

DL7 are recessed portions provided inside of the pattern portion DL1, constituting a click together with a leaf spring DL8 provided in the rotary portion DL2. The recessed portions DL7 are arranged in positions where the electrodes DL3 and DL4 both are out of contact with the brush DL6, or where the switches SW1 and SW2 are off. This click position becomes a setting position.

Figure 9:
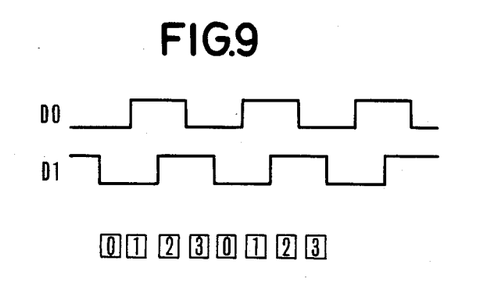

FIG. 9 is waveforms illustrating the relationship of the setting position of the dial pattern and the output states of the switch circuits 6 and 7. When in the click position 0, the switch circuits 6 and 7 both produce outputs of low level (binary "0"). When in a position 1, the output of the switch circuit 6 is 1, and the output of the switch circuit 7 is 0. Also, when in another position 2 or 3, the outputs of the switch circuits 6 and 7 represent the following binary states:

| Position | 0 | 1 | 2 | 3 | 0 |
|---|---|---|---|---|---|
| Switch Circuit 6 | 0 | 1 | 1 | 0 | 0 |
| Switch Circuit 7 | 0 | 0 | 1 | 1 | 0 |

Figure 3:
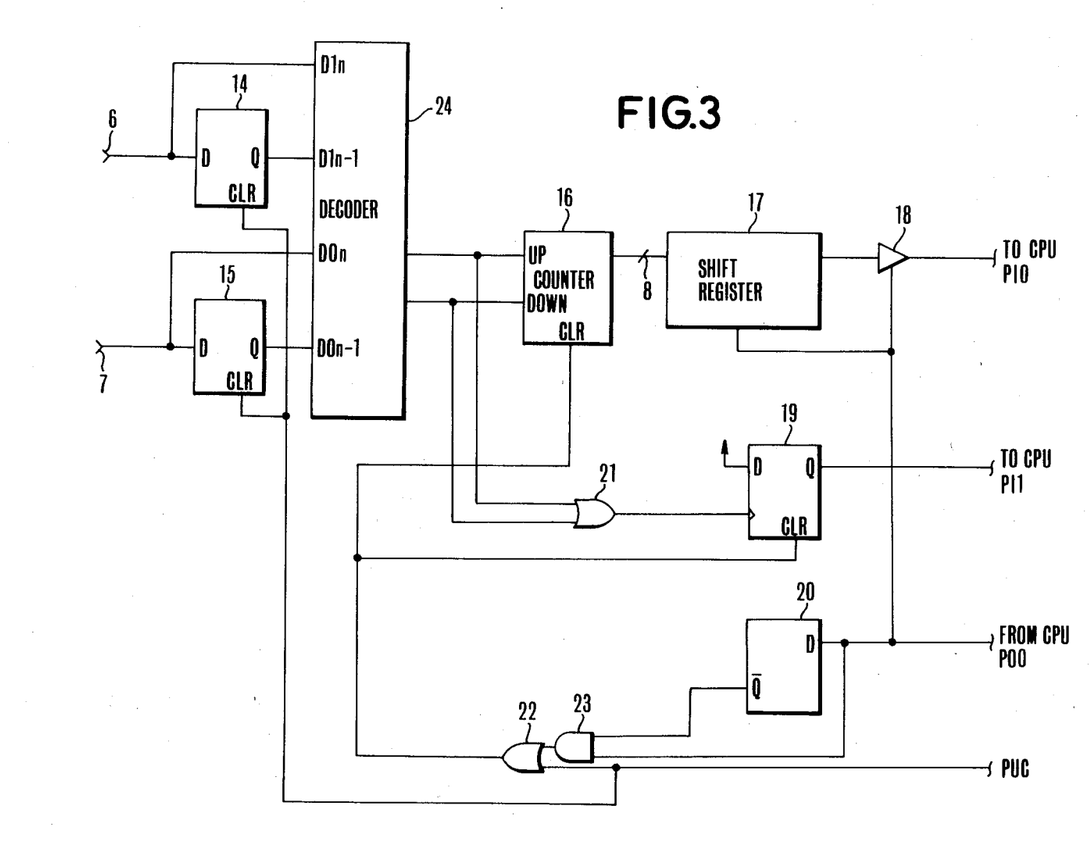
FIG. 3 is an electrical circuit diagram of a practical example of the information input circuit of FIG. 1.

FIG. 3 illustrates the details of the information input circuit having two inputs which are connected to the respective outputs of the switch circuits 6 and 7. D-flip-flops 14 and 15 have their inputs D which are connected to the outputs of the switch circuits 6 and 7 respectively, and function as latch circuits for holding the setting state of the dial patterns of FIG. 2 for a time of one clock after that setting has changed.

A decoder 24 has two inputs D1n and D0n which are connected directly to the outputs of the switch circuits 6 and 7 respectively, and another two inputs D1n-1 D0n-1 which are connected through the D-flip-flops 14 and 15 to the outputs of the switch circuits 6 and 7 respectively so that the states for now of the dial patterns are put on the inputs D1n and D0n of the decoder, and the earlier-by-one-clock states of the dial patterns are put on the inputs D1n-1 and D0n-1 The decoder 24 discriminates the combinations of the levels of the inputs on the input terminals thereof, so that each time the dial turns across the click-stopped position, it produces either an up signal (pulse) or a down signal (pulse) depending on the direction of rotation of the dial. Either of these signals is applied to an up/down counter 16 having 8-bit output stages. For its content of, for example, +2, the output stages are (0, 0,0,0,0,0,1,0). For −1, they are (1,1,1,1,1,1,1,1). That is, in the minus direction, the expression is given by a complement number representation. A shift register 17 receives the content of the counter 16 in parallel and produces outputs serially. A D-flip-flop 19 has a clock input to which are applied the up or down signal from the decoder 24 and is responsive to this signal for producing an output 1. The output of the flip-flop 19 is applied to an input port PI of the CPU 1.

The shift register 17 is responsive to a lead signal from an output port PO0 of the CPU 1 for starting a shift of the input data and serially transfers the above-described data to an input port PI0 of the CPU 1 through a buffer 18.

The buffer 18 is a 3-state buffer and opens in response to the lead signal.

A D-flip-flop 20 receives the lead signal from the output port PO0 of the CPU 1 and its $\overline{Q}$ output is connected to one of the input terminals of an AND gate 23, the other input of which receives directly the lead signal.

Figure 8A:
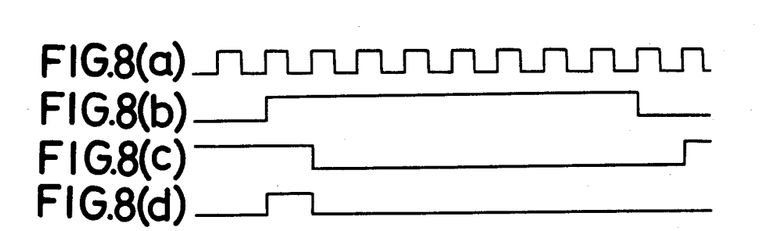

In operating the circuit of FIG. 3, when the lead signal is produced as shown in FIG. 8(b), the flip-flop 20 produces the $\overline{Q}$ output as shown in FIG. 8(c). Then, the AND gate 23 sends a one-shot pulse as shown in FIG. 8(d). For note, the clock pulses shown in FIG. 8(a) are applied to the D-flip-flop 14, 15 and 20 and the shift register 17. In synchronism with the rising edge of each clock pulse, the flip-flop 20 performs the above-described operation, and the shift register 17 shifts the parallel-inputted data in sequence to the input port PI0 of the CPU 1 as has been described above.

The output of the AND gate 23 is connected through an OR gate 22 to the clear terminals CLR of the counter 16 and the flip-flop 19. When the output of the AND gate 23 takes high level (FIG. 8(d)), the counter 16 and the flip-flop 19 are reset.

Figure 4:
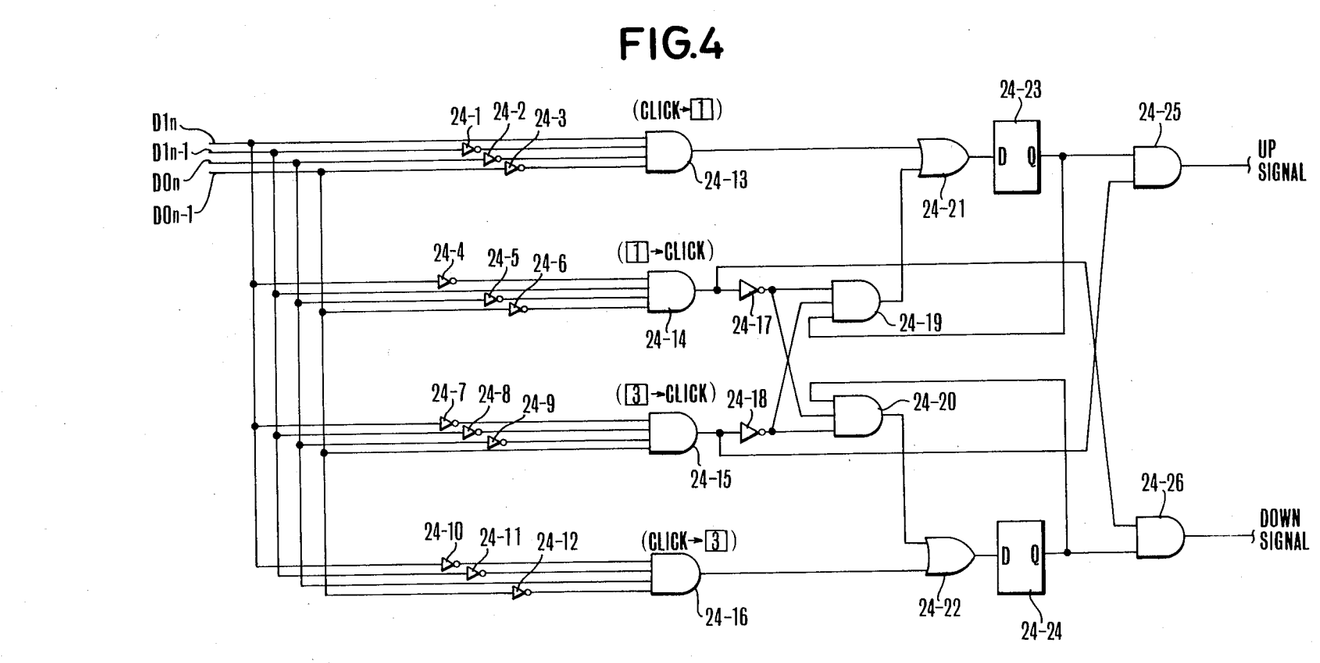
FIG. 4 is an electrical circuit diagram of a practical example of FIG. 3.

FIG. 4 in the electrical circuit diagram illustrates the detail of the decoder 24 of FIG. 3. In the figure, 24-1 to 24-12, 24-17 and 24-18 are inverters; 24-13 to 24-16, 24-19, 24-20, 24-25 and 24-26 are AND gates; 24-21 and 24-22 are OR gates; and 24-23 and 24-24 are D type flip-flops. The flip-flops are supplied with the clock shown in FIG. 8(a).

The AND gate 24-13 is so arranged that when the input D1n of the decoder is 1 and when the inputs D1n-1, D0n and D0n-1 each are 0, its output takes 1. This implies that the AND gate 24-13 changes its output to 1 when the dial moves from the click position 0 to the position 1. The second AND gate 24-14 is so arranged that when the input D1n-1 of the decoder is 1 and when the other inputs D1n, D0n and D0n-1 each are 0, its output takes 1, as the dial moves from the position 1 to the click stopped position 0. The third and fourth AND gates 24-15 and 24-16 change their outputs to 1 respectively when the dial moves from the position 3 to the click-stopped position and from the click-stopped position to the position 3.

The D input of the flip-flop 24-23 is connected through the OR gate 24-21 to the output of the AND gate 24-13. When the output of the OR gate 24-21 changes to 1, the output Q of the flip-flop 24-23 becomes 1. The output of the flip-flop 24-23 is fed back to one of the iputs of the AND gate 24-19, the other inputs of which are connected through the inverters 24-17 and 24-18 to the outputs of the AND gates 24-14 and 24-15. Further, the output of the AND gate 24-19 is connected through the OR gate 24-21 to the D input of the flip-flop 24-23. Because the arrangement is as such, after the D-flip-flop 24-23 has once been set (Q=1) by moving the dial from the click-stopped position to the position 1, the setting state is maintained until the dial returns from the position 1 to the click-stopped position past the positions 2 and 3. Also, the inputs of the AND gate 24-25 are connected to the outputs of the flip-flop 24-23 and the AND gate 24-15 so that it produces 1 in response to change of the Q output of the flip-flop 24-23 and the output of the AND gate 24-15 to 1. With this arrangement, each time the dial is turned in the "up"

direction shown in FIG. 2 from one click-stopped position past the positions 1, 2 and 3 to the next click-stopped position, a pulse as the up signal is produced from the AND gate 24-25.

Also, the D input of the flip-flop 24-24 is connected through the OR gate 24-22 to the outputs of the AND gates 24-16 and 24-20. The three inputs of the AND gate 24-20 are connected through the respective inverters 24-18 and 24-17 to the outputs of the AND gates 24-14 and 24-15 respectively and directly to the output of the flip-flop 24-24. With this connecting arrangement, the flip-flop 24-24 is set in response to change of the output of the AND gate 24-16 to 1. This setting state is maintained until the AND gates 24-14 and 24-15 produce 1, in other words, until the dial is moved from one click-stopped position past the positions 3, 2 and 1 to the next click-stopped position. Also, the inputs of the AND gate 24-26 are connected to the Q output of the flip-flop 24-24 and the output of the AND gate 24-14. Thereby, the AND gate 24-26 produces a pulse as the down signal each time the dial is turned in the DOWN direction indicated by the arrow of FIG. 2 from one click-stopped position to the next click-stopped position.

For note, since, as has been described above, the flip-flops 24-23 and 24-24 are reset in response to 1 from the AND gates 24-14 and 24-15 respectively, the movement of the dial in a shorter distance than one step or below the position 3 in either direction is unable to produce the up or down signal.

Figure 7A:
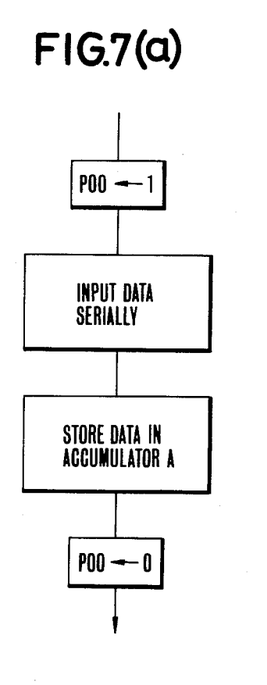
Figure 7B:
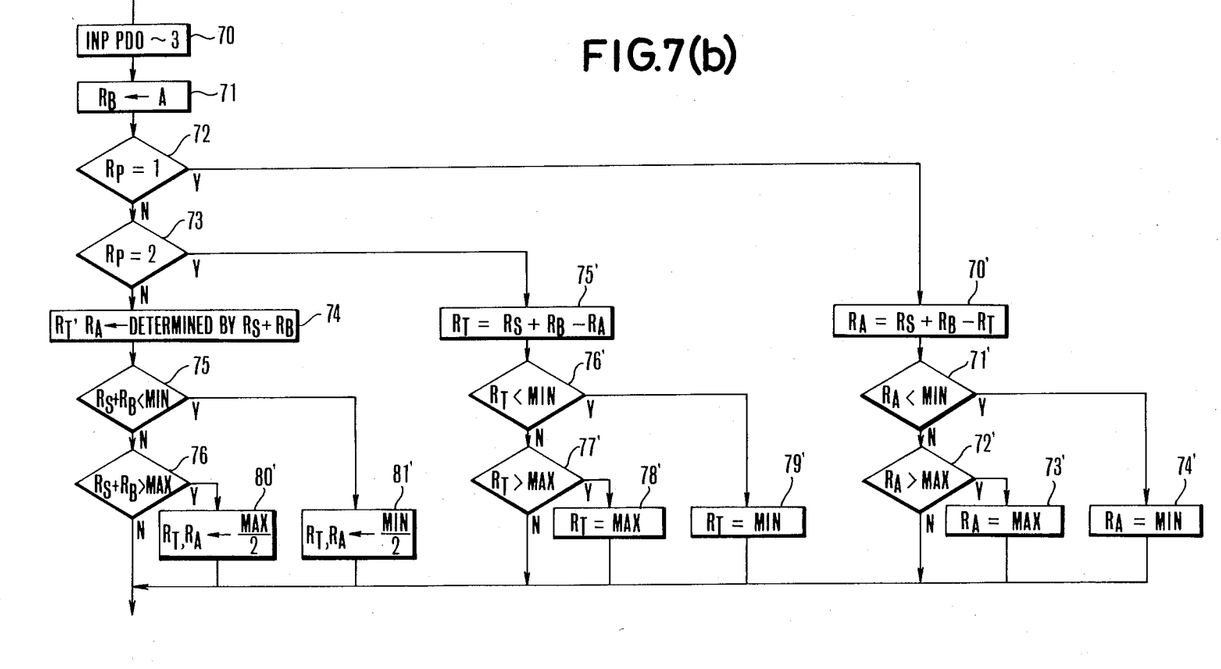

Next, the operation of the FIG. 1 embodiment according to the above-described arrangement will be explained by using the flow charts shown in FIG. 5 up to FIG. 7(b). These flow charts are the flow charts showing the micro and micro command showing the program written in a ROM incorporated in the CPU 1 of FIG. 1. The micro commands are executed in the order of the step numbers shown in the drawings by the CPU 1.

Here, the CPU 1, the decoder 2, the display device 3, the information input device 13 and the switch circuits 6 and 7 are assumed to be always supplied with electrical power, while the light measuring circuit 4, the A/D converter 5, the control circuit 12 and others are assumed to be supplied with electrical power by a main switch (not shown).

When the main switch is turned on by operating an actuator therefor, a sequence operation starts by the program in the CPU 1. First of all, an initial value or memorized value is set in each register in the CPU 1 as shown in the flow chart of FIG. 5. After that, the sequence transits to a sequence of operations of sensing the switches and the dial, setting and altering the informations and presenting a display. This sequence is continued to sensing until the light measuring switch turns on, or the switch 10 turns on. The steps of this sequence are explained by using the micro flow chart shown in FIG. 6.

After the initial value has been set in each of the registers in the CPU 1 as has been described above, the CPU 1 operates according to the program, first sensing the position of the ISO button for setting the ISO information (whether or not the port PI3 is 0), then sensing the position of the mode selector button (whether or not the port PI2 is 0), and then sensing whether or not the present information has been altered by the dial (whether or not the port PI1 is 1 (high level)).

During the sensing of the ISO button, the input state of the input port PI3 (the position of the switch 9) is examined by the command INP PI3 in a step 1, and the result of the examination is discriminated in a step 2.

Now assuming that the ISO button is in depression, the switch 9 is on. Therefore, 0 is detected by the aforesaid command INP PI3, the flow is branched from the step 2 to a step 1''.

In the step 1'', INP PI1 is executed to detect the input state of the input port PI1 of the CPU 1. In the next step 2'', its discrimination is made. If the input state of the input port PI1 is 0, advance to the next step 3'' where the information in the ISO information setting register $R_S$ is sent through the output ports PH0 to PH3 to the decoder 2, and displayed by the display device 3. This loop is then returned to the step 1 again. Such a procedure repeats itself so long as the ISO button is being depressed. For note, since, in this case, the information in the register is left unchanged, the display of the same ISO information continues to be presented.

Assuming that the dial is actuated at a time during the course of execution of the aforesaid loop, then it is further branched to a step 4''. When the dial is turned one step from one to another click-stopped position, the decoder 24 produces the up or down signal which is then applied through the OR gate 24 to the clock terminal of the flip-flop 19. The Q output of the flip-flop 19 then changes to 1. The occurrence of this change is detected in the aforesaid steps 1'' and 2'', permitting the flow to advance to the step 4''. The instruction DATA INPUT for the step 4'' is to apply the data from the input port PI0 to an accumulator A. Its details are shown in FIG. 7(a). That is, for the DATA INPUT, first of all, 1 is sent to the output port PO0, and therefrom is transmitted through the flip-flop 20 of FIG. 3, the gate 23, and the register 17 to the buffer 18. By means of the buffer 18, the data parallel-inputted to the register are serially placed on the input port PI0 in synchronism with the clock.

The equal number of pulses to that of click stops the dial is turned is applied as the up or down signal depending on the direction of the movement of the dial from the decoder 24 to the counter 16 as has been described above. This data of the counter 16 is applied as the parallel data to the register 17. Therefore, this parallel data, that is, the data representing the amount of rotation of the dial, is changed to a serial data by the buffer 18 which enters the CPU 1 at the input port PI0. This is stored in the accumulator A. After that, the output port PO0 sends 0 to close the buffer 18. Thus the inputting of the aforesaid data ends.

In such a manner, when the dial is operated, the corresponding data to the number of click stops crossed is stored in the accumulator A in the step 4''. By the next step 5'', that data is added to the data of the register $R_S$. Thus, the ISO information is renewed by the operation of the dial. Then, whether or not the sum of these data falls in a range of 0 to 10 is examined in steps 6'' and 7''. If so, the sum of the data or the renewed data by the operation of the dial, is displayed in the step 3''. For note, the execution of the steps 6'' and 7'' results in that the aforesaid sum is either smaller than 0 or larger than 10, the content of the register $R_S$ is revised to 0 or 10 in steps 9'' or 8'' respectively. The instructions for the steps 6'', 7'', 8'' and 9'' are that a value to be set is prevented from exceeding above the upper limit of 10, or falling below the lower limit of 0.

For note, any integer between 1 to 10 inclusive represents one of ten discrete values of ISO sensitivity of film.

Next, the case of pushing down the motor selector button will be explained. Since, in this case, the switch 8 turns on, an input of 0 enters the CPU 1 at the port PI2. This is detected in steps 3 and 4, and a jump to a step 10″ occurs. If, in this state, the dial is not operated, the data stored in the register $R_P$ for the mode information is transmitted through the output ports PG0 to PG1 to the display device 3 when steps 11″ and 12″ are performed. Thus, the preset mode based on the data set in the register $R_P$ is displayed. In this state, when the dial is operated, advance to the next step 13″ where the pulse number information (the new data) stored in the counter 16 by operating the dial is transferred to the accumulator A. By the next step 14″, this new data is added to the content of the register $R_P$. After that, if, in the step 15″, the content $R_P$ is determined to be below zero, the content of the register $R_P$ is incremented +3 in the next step 16″. Then, the flow returns to the step 15″ again. The loop of the steps 15″ and 16″ assures that even when the dial is turned in the "down" direction, the content of the register $R_P$ can be made larger than zero. Thus, any data below zero is prevented from being set in the register $R_P$. In a step 17″, whether or not the content of the register $R_P$ is larger than 2 is examined. If so, the content of the register is subtracted by 3 in the next step 18″. Then, the flow returns to the step 17″ again. Thereby, the content of the register $R_P$ is prevented from exceeding 2 even when the dial is turned in the "up" direction. Thus, the content of the register $R_P$ is made to be always set in a range of 0 to 2. After the aforesaid step 17″, a step 12″ follows where the altered content of the register $R_P$ by the operation of the dial is displayed by the display device 3. For note, when the content of the register $R_P$ is 0, the programmed mode is displayed. When 1, the shutter speed priority mode is displayed. When 2, the aperture priority mode is displayed.

Next, the case of leaving both of the ISO button and the mode button not depressed will be explained. In this case, when steps 5 and 6 are performed, whether or not the dial is turned is determined. If the dial has been turned, the data set by the operation of the dial is put into the accumulator A in a step 19″. In the subsequent steps 20″ and 21″, the data of the register $R_P$ is examined. When the content of the register $R_P$ is 1, or the shutter speed priority mode, the flow advances to the next step 22″. In this step 22″, the contents of the accumulator A and a register $R_T$ are added. This register $R_T$ stores information representing a value of the shutter speed. Therefore, the preset value of the shutter speed is altered based on the data set by the dial the step 22″. After that, steps 23″ to 26″ are carried out. These steps constitute a similar instruction to that of the aforesaid steps 6″ to 9″. Therefore, the value to be set in the register $R_T$ is limited to a range of 0 to 10. The data of 0 to 10 in the register $R_T$ corresponds to ten different-by-one-step values of the shutter speed. Therefore, the shutter speed can be set in 10 steps. Also, when the content of the register $R_P$ is 2, or the aperture priority mode, the step 21″ is followed by a step 27″.

The steps 27″ up to 31″ have a similar instruction to that of the aforesaid steps 22″ to 26″. By these steps, a value in a range of 0 to 10 is set in a register $R_A$ for the diaphragm when the dial is operated. For note, the values of 0 to 10 for the register $R_A$ correspond to the ten steps of variation of the aperture opening.

In such a manner, by the steps 19″ to 31″, a desired value of either the shutter speed or the aperture can be set by operating the dial when in the shutter speed or aperture priority mode. Also, if PI1=1 is not detected in the steps 5 and 6, or the dial has not been operated, or the content of the register $R_P$ is 0, or the programmed mode has been set in, the next step 7 is carried out. In this step, the content of the register $R_P$ is sent through the output port PG0-PG1 of the CPU 1 to the display device 3 where the set mode is displayed depending on the content of the register $R_P$.

After that, in steps 8, 9, 32″ and 33″, depending on the content of the register $R_P$, for the shutter speed priority mode, the shutter speed data set in the register $R_T$, or for the aperture priority mode, the aperture data set in the register $R_A$ is transferred through the output ports PH0-PH3 of the CPU 1 to the display device 3 where the newly preset value of the shutter speed or aperture is displayed.

Figure 5:
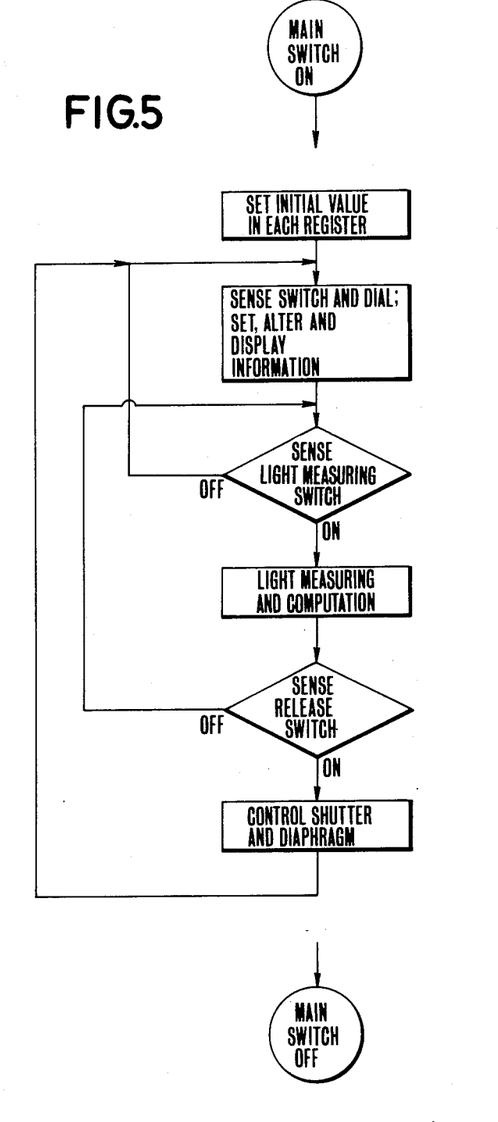
FIGS. 5, 6, 6(a), 6(b), 7(a) and 7(b) are flow charts of an example of the program for the CPU of FIG. 1.
Figures 6, 6B:
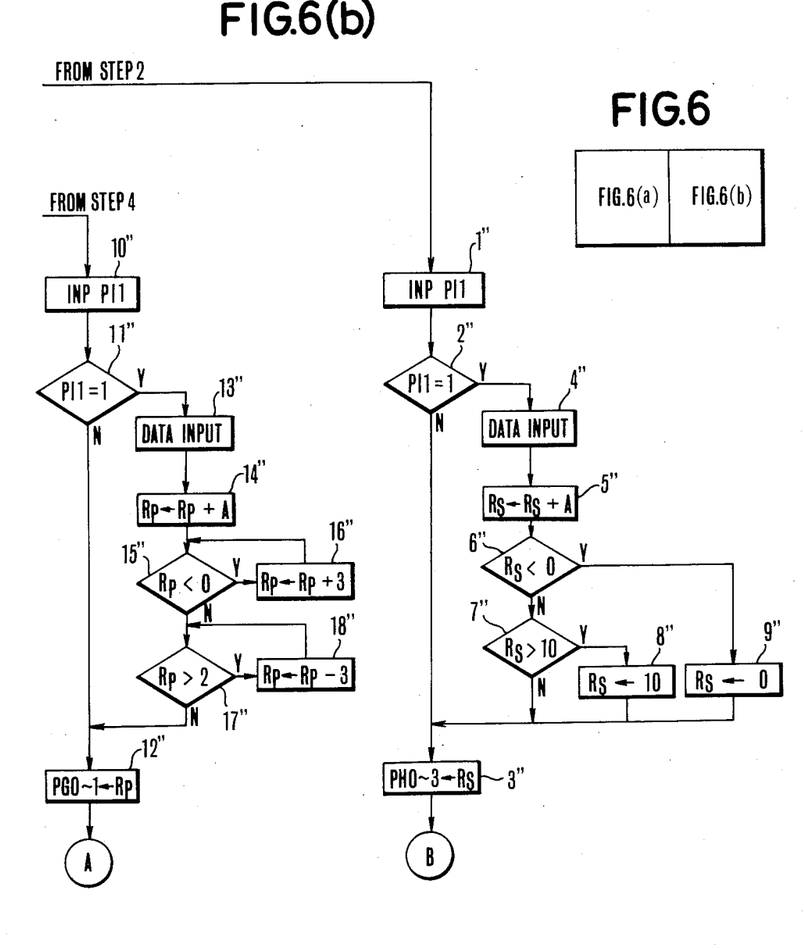
Figure 6A:
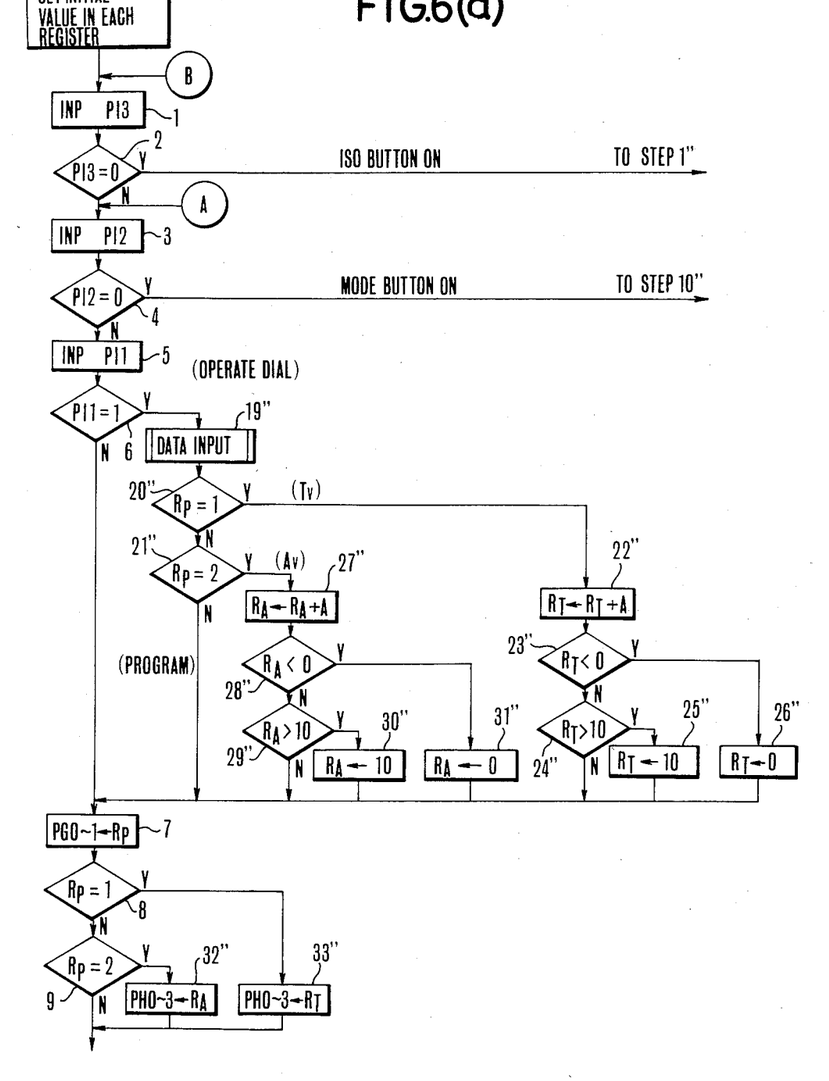

After the various informations have been set in such a way, the program performs the sensing of the light measuring switch as shown in FIG. 5. This sensing is determination of whether the switch 10 responsive to the movement of the release button is turned on or off. If the switch 10 is off, the flow returns to the step 1 of FIG. 6 again. If on, a jump to a program for the light measurement and exposure value computation occurs. This program is executed according to the micro flow chart shown in FIG. 7(b).

This program is explained below. First of all, in steps 70 and 71, the data on the input ports PD0-3 of the CPU 1 is put through the accumulator A to a brightness register $R_B$. Because the aforesaid input ports PD0-3 are connected to the outputs of the A/D converter 5, a corresponding digital value to the brightness information sensed by the light measuring circuit 4 at full open aperture in the TTL light measuring mode is put into the register $R_B$. In the next steps 72 and 73, the data in the register $R_P$ is inquired. If the preset mode is the shutter speed priority, a jump to a step 70' occurs. If it is the aperture priority mode, jump to a step 75' occurs.

In the case of the shutter speed priority mode, in the step 70', the content of the register $R_T$ is subtracted from the sum of the contents of the registers $R_S$ and $R_B$, and the result is put in the register $R_A$. Since the contents of the registers $R_S$, $R_B$ and $R_T$ represent the value Sv of sensitivity of the used film, the brightness level Bv and the preset value of the shutter speed Tv, the data stored in the register $R_A$ represents the computed value of aperture Av, all these values being the Apex values. This computed aperture value Av is compared with either of the upper and lower limits MAX and MIN of a dynamic range of the diaphragm in steps 71' to 74'. If MIN<Av<MAX, the computed Av value itself is stored in the register $R_A$. If MAX<Av, MAX is put in the register $R_A$. If MIN>Av, MIN is put. Thus, the register $R_A$ will store the computed Av value in the controllable range. Also, when in the aperture priority mode, a similar treatment to that of the aforesaid steps 70' to 74' is performed in steps 75' to 79' so that the computed Tv value in the controllable range is set in the register $R_T$.

Also, when in the programmed mode, a step 74 is carried out. In this step, addition of the contents of the registers $R_S$ and $R_B$ is performed to obtain an Apex exposure value based on the formula: $Bv+Sv=Ev$. This Ev value is, for example, halved, and these two halves, or Ev/2, are put in the registers $R_A$ and $R_T$ respectively.

In steps 75, 76, 80' and 81', whether or not the aforesaid Ev value lies between the prescribed upper and lower limits MAX and MIN is examined. If MIN<-Ev<MAX, the contents of the registers $R_T$ and $R_A$ are retained without any alternation. If Ev>MAX, or <MIN, MAX/2 or MIN/2 is set in the register $R_T$ or $R_A$ respectively.

By these steps, the Tv and Av values based on the brightness in the controllable ranges are set in the registers $R_T$ and $R_A$ respectively.

After the Apex computation in each mode has been performed in such a way, the program advances to sense the release switch of FIG. 5. By this program, whether the switch 11 responsive to the release button is on or off is determined. If the switch 11 is off, the sensing of the light measuring switch is performed again. If the switch 11 is on, the program advances to control the shutter and the diaphragm. The shutter speed and the aperture opening are controlled in accordance with the contents of the registers $R_T$ and $R_A$ respectively. After that, the information setting operation is carried out again.

The foregoing procedure is followed by an exposure operation. But, when the aforesaid dial is operated, the setting of the information is effected by the full movement of the dial from one to the next click-stopped position. Therefore, the dial is held usually in one of the click-stopped positions. In this position, as has been described above, the brush DL6 is taken out of the contact with the electrodes DL3 and DL4. Therefore, the switches SW1 and SW2 are usually maintained open with an advantage that no electrical power is prevented from being wastefully consumed by the pullup resistors of the switch circuits 6 and 7.

As has been described in greater detail above, in the present invention, the on/off signal formed by the switch means in response to stepwise movement of the operating member is once counted by a counter, then the counted value of that counter is read out by a computer, then the read out data by that computer is subjected to addition treatment, and further the counter is reset each time the reading out operation is recycled. Therefore, even when the aforesaid operating member is moved at a high speed, without the necessity of increasing the capacity of the counter, it is made possible for the computer to treat the data accurately. Another advantage is that because the switch is opened when the operating member is in the at-rest position, the electrical power which would otherwise be wastefully consumed can be saved.

What is claimed is:

1. A photographic information setting device for use in providing digital values of such information, comprising:
    (a) switch means having ON and OFF states and an operating member movable to change the state of said switch means, said switch means generating an output signal upon each occurrence of state change thereof from OFF to ON and upon each occurrence of state change thereof from ON to OFF;
    (b) counter means connected to said switch means for counting digitally occurrences of said switch means output signal; and
    (c) computer means connected both to said switch means and to said coutner means and responsive to said switch means output signal for reading out and storing the digital count value of said counter means.

2. A device according to claim 1, wherein said computer means includes register means for storage of said digital count value and for accumulating with such stored digital count value a further digital count value stored in said counter means in response to another ocurrence of state change of said switch means.

3. A device according to claim 1, wherein said computer means is operative to reset said counter means upon each such readout of said digital count value therein.

4. A device according to claim 1, wherein said switch means operating member is a rotary member.

5. A device according to claim 1, wherein said switch means includes a signal forming circuit responsive to movement of said operating member for generating said switch means output signal.

6. A device according to claim 1, wherein said computer means is responsive to said switch means output signal to generate a lead signal for effecting such readout of said counter means.

7. A device according to claim 6, further comprising a shift register connected to said counter means for receiving therefrom signals indicative of said digital count value therein, said shift register receiving said lead signal and being responsive thereto to send said signals indicative of said digital count value serially to said computer means.

8. A photographic information setting device for use in providing digital values of such information, comprising:
    (a) an operating member supported for movement;
    (b) first contact means including a contact movable with said operating member and structure defining stop positions for said operating member at prescribed intervals of such movement thereof;
    (c) power supply means having a first terminal connected to said movable contact and having a second terminal;
    (d) an ON/OFF signal forming circuit for producing a signal representing an ON or an OFF state and including second contact means for connecting said movable contact in series circuit with said power supply means second terminal to supply current therethrough selectively between successive such intervals and not connecting said movable contact to said power supply means second terminal when said movable contact is lcoated at such stop positions, whereby an ON signal is selectively generated, but an OFF signal is generated at each such stop position and said power supply means in not consumed at said stop positions, said second contact means comprising a succession of contacts disposed between said stop positions in a common series circuit; and
    (e) counter means connected to said signal forming circuit for counting digitally occurrences of such ON and OFF signals.

9. A device according to claim 8, wherein said operating member is a rotatable member.

10. A device according to claim 9, wherein said second contact means comprises a substrate having an electrically conductive pattern and an electrically non-conductive pattern in alternating relation thereon and wherein said first contact means scans said patterns in the course of rotation of said operating member, electrical current flow between said first and second contact means occuring when said first contact means engages said electrically conductive patterns.

11. A device according to claim 10, wherein said first contact means engages said electrically non-conductive patterns in each such stop position.

12. A device according to claim 8, wherein said structure defining said stop positions defines same as click positions.

13. A device according to claim 8 wherein said succession of contacts of said second contact means is arranged to effect a succession of ON and OFF signals during movement of said movable contact between such stop positions.

14. A photographic information setting device for use in providing digital values of such information, comprising:
   (a) switch means having ON and OFF states and an operating member movable to change the state of said switch means, said switch means including structure defining stop positions for said operating member at prescribed intervals, said switch means being in OFF state when said operating member is in said stop positions and changing to ON state selectively during movement of said operating member from one stop position to a successive stop position, such digital values being generated upon each occurrence of such change in state of such switch means, said switch means comprising a succession of contacts disposed between said stop positions in a common series cirucit; and
   (b) circuit means for storing and accumulating said digital values upon repeated generation thereof by movement of said operating member through plural such stop positions.

15. A device according to claim 14, wherein said operating member is a rotatable operating member.

16. A device according to claim 15, wherein said succession of contacts is defined by a substrate having an electrically conductive pattern and an electrically non-conductive pattern in alternating relation thereon and wherein said operating member includes contact means movable therewith to scan said patterns in the course of rotation of said operating member, electrical current flow between said substrate and said contact means occuring when said contact means engages said electrically conductive patterns.

17. A device according to claim 16, wherein said first contact means engages said electrically non-conductive patterns in each such stop position.

18. A device according to claim 14, wherein said structure defining said stop positions defines same as click positions.

19. A device according to claim 14 wherein said succession of contacts is arranged to effect a succession of ON and OFF signals during movement of said operating member between such stop positions.

* * * * *